AUTOMATIC GAIN CONTROL FOR TELEVISION RECEIVER PROVIDING CONTROL DURING WEAK SIGNAL RECEPTION

Filed Sept. 11, 1951 2 Sheets-Sheet 1

INVENTOR.
EDWARD GARY CLARK
BY
Brown, Denk & Synnestvedt
AGENTS

March 1, 1955 E. G. CLARK 2,703,341

AUTOMATIC GAIN CONTROL FOR TELEVISION RECEIVER PROVIDING CONTROL DURING WEAK SIGNAL RECEPTION

Filed Sept. 11, 1951 2 Sheets-Sheet 2

INVENTOR.
EDWARD GARY CLARK
BY Brown, Denk & Synnestvedt
AGENTS

United States Patent Office 2,703,341

Patented Mar. 1, 1955

2,703,341

AUTOMATIC GAIN CONTROL FOR TELEVISION RECEIVERS PROVIDING CONTROL DURING WEAK SIGNAL RECEPTION

Edward Gary Clark, Elkins Park, Pa., assignor to Philco Corporation, Philadelphia, Pa., a corporation of Pennsylvania Application September 11, 1951, Serial No. 246,101

8 Claims. (Cl. 178—7.3)

Figure 1:
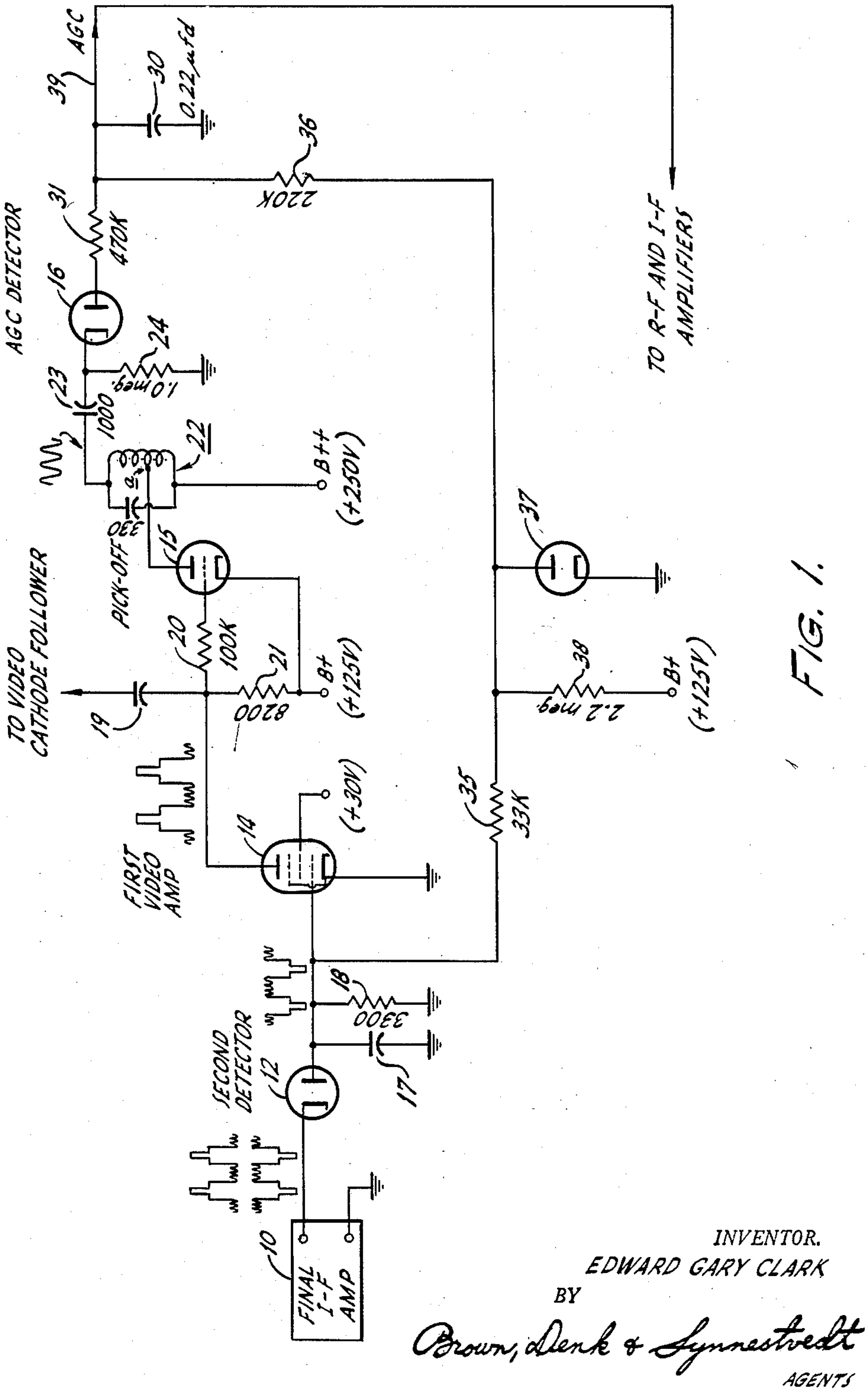

The invention herein described and claimed relates to automatic-gain-control (AGC) systems for television receivers.

As is well known, the purpose of the automatic-gain-control (AGC) system is to maintain, at a selected point within the television receiver, a substantially constant signal level despite variations in input-signal strength. As is also well known, for best results the automatic-gain-control system should measure the peak carrier level, not the average or mean carrier level. For the latter varies with picture information and is, therefore, not a true indication of signal strength, whereas the peak level of the carrier is independent of picture content.

If a simple peak detector were used to measure the peak carrier level a major difficulty would arise in that, in the presence of strong noise impulses, the detector would measure the noise height rather than the signal height. And, due to the fact that a simple peak-detector circuit includes a long time-constant discharge path, the erroneously large automatic-gain-control (AGC) bias developed as a result of the noise impulse would reduce the gain of the R.-F. and I.-F. stages for such a long interval that synchronization would be lost for at least several horizontal lines.

The prolonged effect of a noise burst could, of course, be minimized by a fast AGC system, i. e. an AGC system employing a short time-constant circuit in both the charge and discharge paths, since such a system, following a noise burst, would return more quickly to normal bias. A fast AGC system would also have the advantage of being able to follow fast changes in signal strength such as occur when an airplane passes near to the antenna of the receiver. Such an AGC system would, however, be upset more readily than a slow AGC system, though it would return to normal more quickly, as has already been indicated above. Another disadvantage of a fast AGC system is that a considerable portion of the vertical synchronizing signal would be removed, for the relatively long vertical synchronizing pulses would appear to the AGC system as an increase in signal-carrier level, and the AGC system would operate to reduce the receiver gain during the vertical-synchronizing-pulse interval. Thus, a simple fast AGC system has disadvantages as well as advantages.

One solution provided by the prior art to the apparent dilemma indicated above is the pulsed or keyed AGC system. In such a system, a narrow pulse of horizontal line frequency is used to gate or turn on the AGC system during the horizontal-synchronizing-signal interval, the AGC system being insensitive the remainder of the time. Since the horizontal synchronizing pulse in a conventional television system is 5 microseconds long, which is about 8 per cent of the horizontal line interval of 63.5 microseconds, the keyed AGC system is insensitive to noise impulses during the remaining 92 per cent of the horizontal-line interval. This feature constitutes, of course, an important advantage of the keyed AGC system.

In the prior-art keyed AGC system, the keying pulse is usually obtained from the local horizontal oscillator. Alternatively, the keying pulse may be obtained from the separated synchronizing signal, but this method is inferior with respect to noise since noise impulses become keying signals which measure themselves.

An advantage of the prior-art keyed AGC system, in addition to immunity from noise for about 92 per cent of the time, is that the AGC action can be made fast without having the gain of the receiver erroneously reduced during the vertical-synchronizing-pulse interval. The explanation is, of course, that since the keyed rectifier is only sensitive for very short periods of time at horizontal-line frequency and since the height of the vertical synchronizing pulse is the same as that of the horizontal pulse, the keyed AGC system does not have the opportunity of erroneously interpreting the long vertical synchronizing pulses as an increase in carrier signal strength.

While definite advantages are derived from the keyed AGC system, there are also some disadvantages. For example, the keyed AGC system may be disturbed by drift or adjustment of the frequency or phase of the local horizontal oscillator. Moreover, if a keyed AGC system be used in a television receiver which employs two chassis, one for the power supply and deflection circuits and another for the R.-F., I.-F. and remaining circuits, the locally-generated line-frequency keying pulses must be conducted from one chassis to the other and unless the inter-chassis leads over which the keying pulses are conducted are carefully shielded, they constitute a possible source of interference.

It is an object, therefore, of the present invention to provide an automatic-gain-control (AGC) system which has the advantages of the prior-art keyed AGC system without, however, having the attendant disadvantages.

Stated more particularly, it is the object of the present invention to provide an automatic-gain-control system which has substantial immunity to impulse noise, is adapted for use in an otherwise conventional television receiver, is of moderate cost, is fast enough to maintain the video output signal at a substantially constant level despite rapid variations in signal strength, and is free and independent of the operation of the receiver's horizontal oscillator.

The foregoing objects are accomplished, in accordance with a preferred embodiment of my invention, by providing between the first video amplifier and the automatic-gain-control (AGC) detector, narrow-band selective means responsive to the horizontal line frequency and substantially unresponsive to other frequencies. More particularly, the narrow-band selective means comprises a high-Q tuned circuit which is shock excited by the fundamental of the horizontal-synchronizing-pulse component of the video signal to produce a sine wave of horizontal line frequency whose amplitude is proportional to the amplitude of the horizontal synchronizing pulses. And, since the amplitude of the horizontal synchronizing pulses varies as a function of signal carrier level, the amplitude of the sine wave developed across the tuned circuit is a measure of the carrier level. Moreover, since the sine wave thus developed is independent of the picture portion of the video signal, the sine wave may be A.-C. coupled to an averaging, as distinguished from a peak, detector to produce a D.-C. voltage which is proportional to the strength of the carrier wave. It is this D.-C. voltage which is used, in accordance with the present invention, as an AGC signal to control the gain of the R.-F. and I.-F. amplifier stages. The proposed AGC system also preferably includes an improved anti-blocking circuit to prevent overloading of the I.-F. amplifiers.

Figure 2:
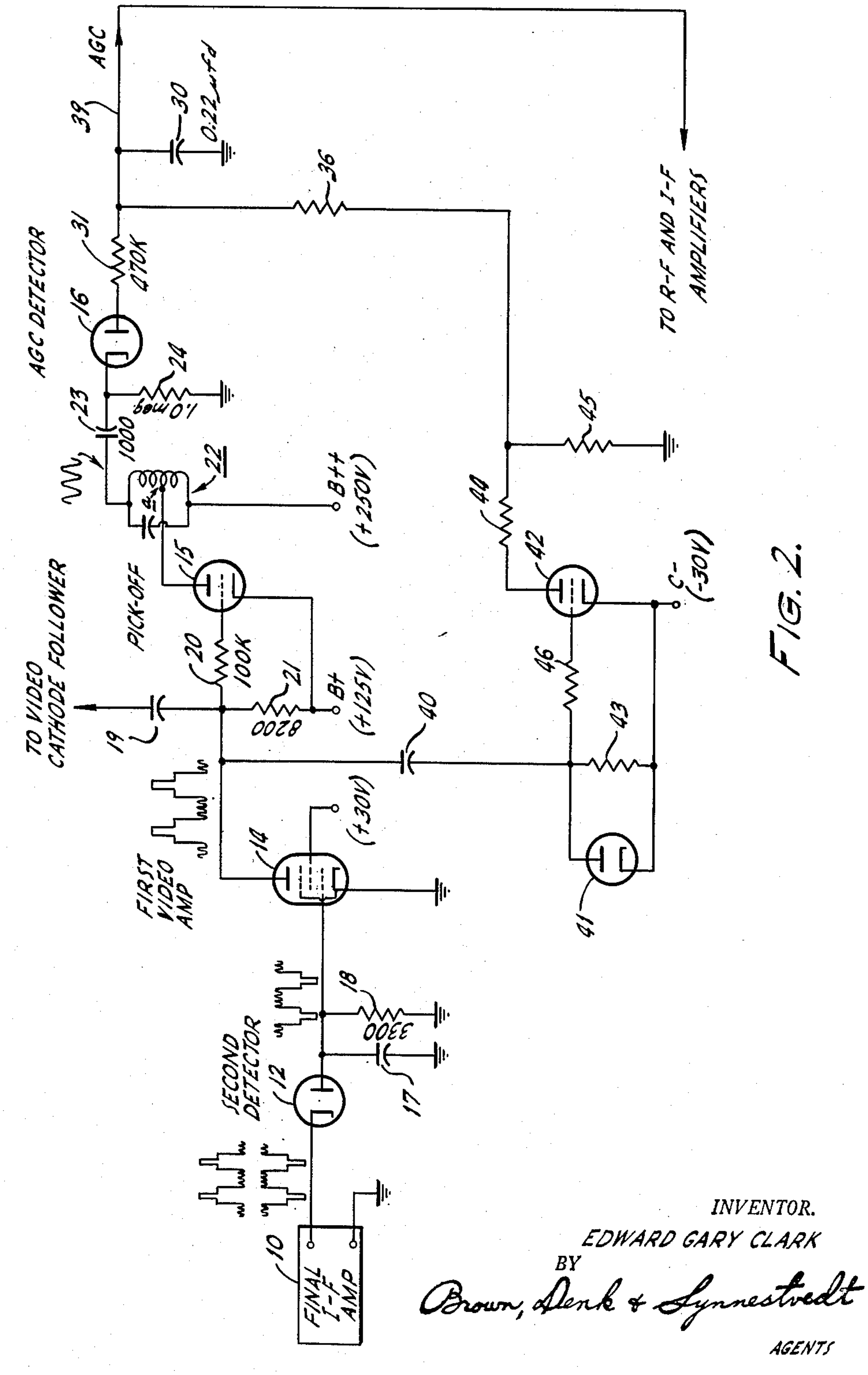

The invention will be best understood from a consideration of the following detailed description and accompanying drawing wherein Figure 1 illustrates a preferred embodiment of the invention and Figure 2 incorporates an alternate form of anti-blocking arrangement.

Referring now to Figure 1, there is shown a portion of a television receiver which includes the last I.-F. amplifier stage 10, the second detector 12, the first video amplifier 14, a pick-off tube 15, and an AGC detector 16.

The signal from the final I.-F. amplifier stage 10 is applied to the second detector 12, the latter being so poled that the synchronizing pulses of the detected video signal are negative at the grid of the first video amplifier tube 14. The bias on tube 14 is arranged to be such that when the video signal applied thereto is of expected maximum amplitude (as controlled by the AGC system) the tips of the negative-going synchronizing pulses fall just above the cut-off of the tube. Thus, since the positive excursions of the plate of tube 14 are limited by the cut-off of the tube, noise pulses in the plate circuit of the first video amplifier tube 14 are limited by cut-off to a peak value which is but slightly greater than that of the synchronizing pulses, thereby improving the signal-to-noise ratio at the plate of the tube.

The video signal developed across plate load resistor 21 of first video amplifier 14 is applied, by way of coupling capacitor 19, to a video cathode follower (not shown) and is also applied, by way of a D.-C. connection which includes the isolating resistor 20, to the grid of the pick-off tube 15.

It may be pertinent at this point to remind the reader that, ordinarily at least, to develop an AGC biasing voltage, it is necessary to preserve the D.-C. component of the video signal between the second detector and the AGC detector. However, in the AGC system of the present invention it is only necessary to use D.-C. coupling from the second detector to the pick-off tube. For a reason later stated, the connection between the pick-off tube and the AGC detector may preferably, though not necessarily, comprise A.-C. coupling means, such as the capacitor 23, thus making it unnecessary to operate the AGC detector at a relatively large positive potential with respect to ground, as is usually the case where D.-C. coupling is employed, and making it unnecessary to employ the usual voltage-dropping glow tube to reduce the positive voltage to a negative potential suitable for AGC purposes.

Returning again to Figure 1, bias for the pick-off tube 15 is developed across load resistor 21 by the D.-C. component of the first-video-amplifier plate current flowing therethrough. The bias is arranged to be of such magnitude that pick-off tube 15 is driven into conduction by the synchronizing pulses but remains cut off during the picture portion of the detected video signal.

In accordance with the present invention, the pick-off tube 15 is arranged to drive a high-Q parallel-resonant circuit 22 preferably tuned to the horizontal synchronizing frequency, which in a conventional receiver is 15.75 kilocycles. Alternatively, the circuit 22 may be tuned to a harmonic of the horizontal line frequency. However, to facilitate the remainder of the description, it will be assumed that the circuit 22 is tuned to 15.75 kc., the horizontal line frequency. The tuned circuit 22 is shock excited by the fundamental component of plate current flowing in pulses at horizontal line frequency through pick-off tube 15 and as a result there is developed across the tuned circuit 22 a sine wave voltage of horizontal line frequency whose amplitude is proportional to the amplitude of the plate current flowing through tube 15. And, since the latter is proportional to the carrier level of the video signal, it follows that the amplitude of the sine wave voltage developed across the tuned circuit 22 is representative of the carrier level.

In the preferred embodiment shown in the drawing, the plate current of pick-off tube 15 is fed to a tap, point *a*, on the inductance of the tuned circuit 22 rather than to the upper end of the inductance. One advantage of so doing is that a voltage step-up is thereby obtained, the inductance acting as an auto-transformer. Another is that it avoids having the pick-off tube 15, whose impedance is very low when conducting, load down the entire tuned circuit. Using the preferred arrangement, the peak amplitude of the sine wave developed across tuned circuit 22 may, in a typical case, be several hundred volts.

Since the amplitude of the sine wave voltage developed across tuned circuit 22 is proportional to the amplitude of the synchronizing signals and is unaffected by the picture intelligence of the video signal, the D.-C. component of the video signal is no longer of any interest so far as the development of an AGC biasing voltage is concerned. Accordingly, the sine wave signal developed across tuned circuit 22 may be A.-C. coupled, by way of capacitor 23, to the AGC detector 16. The advantage of employing A.-C. rather than D.-C. coupling has been previously indicated.

Moreover, since the average amplitude of the sine wave signal is not a function of picture content, and is proportional to the amplitude of the carrier, AGC detector 16 may be an averaging detector rather than a peak detector. In a typical case, the response time-constant of the circuit of the averaging AGC-detector 16 may be of the order of one-tenth of a second, which is equal to three frames or 1575 lines, and the recovery time-constant may be of the order of one-twentieth of a second. With a response speed as slow as one-tenth of a second, the averaging AGC detector does not respond to noise impulses to the same extent that a peak detector would. Hence, the averaging detector provides some protection against impulse noise.

Further noise immunity is provided by the large positive swing of the cathode of AGC-detector tube 16. This effectively provides time gating against noise for a substantial portion of each horizontal line.

The major immunity to individual noise impulses is provided, however, by the high inertia of the tuned circuit 22 which prevents cycle by cycle amplitude changes. Stated another way, the high-Q tuned circuit 22 is a statistical device which responds only to trends and is relatively insensitive to an isolated pulse. The tuned circuit 22 is, therefore, substantially insensitive to all impulse noise except that which occurs at horizontal line frequency and in phase therewith. The amount of such noise is, however, very small, if not negligible.

Attention is now invited to the fact that when the television receiver is switched from a weak signal to a strong signal a condition of overload may momentarily exist which could wipe off the synchronizing pulse and thereby prevent excitation of the tuned circuit 22. The A.-C. component would then disappear from the plate current of pick-off tube 15 and, where A.-C. coupling is employed, no signal voltage would be applied to the cathode of the AGC detector 16. Hence, no AGC biasing voltage would be developed and the overload condition on the I.-F. tubes would tend to remain.

To insure that the foregoing does not happen where A.-C. coupling is used, the systems shown in Figures 1 and 2 are so arranged that, if an overload condition should momentarily occur, a negative D.-C. signal is added to the AGC lead 39 by way of a path which bypasses the pick-off tube 15 and the tuned circuit 22. In the particular anti-blocking arrangement shown in Figure 1, a portion of the output of the second detector 12 is applied, by way of resistor 35, gating diode 37, and resistor 36, to the AGC filter capacitor 30. Thus (assuming the gate is open), there is added to the AGC lead 39 a D.-C. component of negative polarity the magnitude of which is proportional to the average amplitude of the detected video signal. This added component is effective to prevent blocking of the AGC detector in the event an instantaneous overload wipes off the synchronizing modulation at the second detector. However, unless preventive measures were taken, the addition of this anti-blocking component to the AGC lead 39 would have the undesirable effect of contributing to AGC backoff on weak signals, since it would be adding an AGC component derived from averaged impulse noise. This undesirable effect is prevented by the gating diode 37 in combination with the bleeder resistor 38, the source of positive voltage B+(+125 v.), the resistor 35 and the resistor 18. The manner in which these elements function will now be described.

If the output of second detector 12 were zero, i. e., in the absence of both noise impulses and video signals, diode 37 would conduct and there would be developed at the anode of the diode 37 a positive voltage of negligible magnitude determined by the value of the B+ voltage and the relative resistances of resistor 38 and diode 37 when conducting. In a typical case, the resistance of the diode 37 when conducting may be of the order of a few hundred ohms, while the resistance of resistor 38 may be of the order of several megohms. Hence, with B+ at +125 volts and diode 37 conducting, the potential at the anode of diode 37, in the absence of both signal and noise, would be of the order of +0.01 volt, which may be deemed negligible.

In the presence of signal and/or noise, since a portion of the detected signal is applied across resistor 35, resistor 36 and capacitor 30, a negative D.-C. voltage is developed which appears at the anode of diode 37 in sufficient magnitude to cut the diode off. When this occurs, a positive delay voltage appears at the anode of the diode 37 as a result of the positive voltage source B+ and the voltage-divider action of resistors 38, 35 and 18. In the circuit illustrated in the drawing, the parameters shown are such that the delay voltage at the anode of diode 37 (when the diode 37 is not conducting) would be of the order of +2.0 volts. On weak signals, this delay voltage is just about canceled by the negative D.-C. voltage developed at the diode anode by signals and noise, so that there is substantially no voltage on the AGC lead 39 resulting from the anti-blocking path. Should the signals and noise be so weak that the negative D.-C. voltage developed at the anode of diode 37 is insufficient to completely cancel the positive delay voltage (+2.0 volts in the present illustration), diode 37 would conduct, thus preventing the application of an undesirable positive voltage to the AGC lead 39. On strong video signals, the negative voltage developed at the anode of diode 37, as a result of the filter action of capacitor 30 and resistors 36, 35 and 18, is more than sufficient to overcome the positive delay voltage (+2.0 volts), and diode 37 remains in cut-off condition. A negative voltage is thus added to the AGC lead 39 by way of the anti-blocking path. This negative D.-C. voltage is effective to prevent overloading of the I.-F. amplifiers, thus insuring that the tuned circuit 22 will be excited by the fundamental component of plate current of pick-off tube 15.

If desired, the parameters of the system can be so chosen that, on signals of normal strength, the AGC component resulting from the action of the path comprising the tuned circuit 22 and the AGC detector 16 is sufficient to limit the negative D.-C. voltage which tends to be contributed by way of the anti-blocking circuit to less than the positive delay voltage, so that the net AGC bias on lead 39 is due entirely to the action of the path which includes the tuned circuit 22.

Alternatively, the system components can be so selected that, on normal-strength signals, a portion of the AGC voltage is supplied to AGC lead 39 by way of the anti-blocking circuit, the remainder being provided by way of the tuned circuit 22. Analysis will show that the total of these two AGC components is always substantially equal to the AGC bias which would have been developed by the tuned circuit 22 and AGC detector 16 in the absence of the anti-blocking circuit. For, the negative D.-C. voltage contributed to the AGC lead by the anti-blocking path operates as a delay voltage at the anode of the AGC detector 16.

The anti-blocking circuitry shown in Figure 1 and described above comprises a simple and very satisfactory arrangement whereby, should an instantaneous overload occur in the I.-F. amplifier strip, blocking of the A.-C. coupled AGC-rectifier circuit is prevented without introducing undesirable AGC backoff on weak signals. While, because of its simplicity and inexpensiveness, I prefer to use the anti-blocking arrangement shown in Figure 1, a more elaborate arrangement, shown in Figure 2, may be used to produce results which, so far as noise immunity is concerned, are somewhat better than those produced by Figure 1.

In Figure 2, a portion of the detected and amplified video signal is A.-C. coupled, by way of capacitor 40, to a peak detecting diode 41, the diode being so poled that a negative D.-C. output voltage is developed at the anode end of load resistor 43. This voltage is applied, by way of resistor 46, to the control grid of a sharp cut-off triode 42 and so biases the triode that it does not conduct when the video signal applied to the detecting diode 41 is of normal strength. If, however, on a strong signal, the receiver should momentarily overload so as to remove the A.-C. modulation from the output of second detector 12, the peak detecting diode 41 would produce zero output and triode 42 would conduct. A negative D.-C. voltage would then be developed across resistor 45 which would be added to the AGC lead 39. This voltage is of sufficient magnitude to remove the overload condition. The parameters of the circuit of Figure 2 may be so chosen that on small signals and small noise the detector 41 produces sufficient negative D.-C. output voltage to bias triode 42 beyond cut-off, but on the still smaller A.-C. signal which attends an overload condition the detector 41 fails to develop sufficient bias to cut the triode off.

It will be seen that the anti-blocking circuits both of Figure 1 and of Figure 2 function to add an AGC-signal component to the AGC lead 39 when, and only when, the detected video signal is stronger than a predetermined value. Thus, AGC backoff on weak signals is avoided. In both anti-blocking circuits, this desirable result is accomplished by electronic gating means sensitive to the amplitude of the detected video signal. In the anti-blocking circuit of Figure 1, the second detector 12 is D.-C. coupled to the diode clamp or gating tube 37. When the D.-C. component of the detected video signal exceeds the positive delay voltage, previously referred to, diode 37 cuts off and a negative D.-C. voltage component is then added to the AGC lead 39. In the anti-blocking circuit of Figure 2, the detected and amplified video signal is applied to the gating means (peak detector 41 and sharp cut-off triode 42) by way of an A.-C. coupling (capacitor 40) and the gating means is responsive to the amplitude of the A.-C. component of the video signal. When the A.-C. component of the video signal is less than a predetermined value, the bias developed by peak detector 41 is insufficient to keep triode 42 cut off, and the triode conducts thereby adding a negative D.-C. voltage component to the AGC lead 39. It is not essential, however, that the added negative D.-C. component be applied directly to the AGC lead 39. If desired, the AGC detector 16 could be a triode and the negative D.-C. component developed by the anti-blocking circuit could be applied to the grid of the triode detector.

Having described my invention, I claim:

1. In an automatic-gain-control system for a television receiver; a source of detected video signal having picture-intelligence and synchronizing-pulse components; means for applying said detected video signal to a pick-off tube so biased that said tube is cut-off during the picture-intelligence portion of said applied video signal but conducts during the synchronizing-pulse intervals; a network connected in the plate-cathode circuit of said pick-off tube tuned to the frequency of said horizontal synchronizing pulses, whereby said tuned network is shock excited by the pulses of plate current which flow through said pick-off tube during the horizontal-synchronizing-pulse intervals, and whereby there is developed across said tuned network a sine wave signal of horizontal-synchronizing-pulse frequency whose amplitude is a function of the amplitude of the synchronizing pulses applied to said pick-off tube; an automatic-gain-control-detector circuit; alternating-current coupling means for applying said sine wave signal to said automatic-gain-control-detector circuit to develop a direct-current control signal whose magnitude is a function of the amplitude of said sine wave signal; and bypass means coupling said source of detected video signal to said automatic-gain-control-detector circuit by a path which bypasses said pick-off tube and tuned network, said bypass means including gating means sensitive to the amplitude of a component of the detected video signal and adapted to discriminate between detected video signals of different strength, said gating means operating when said component of said detected video signal is different in a selected direction from a predetermined value, said bypass means also including means whereby, as a result of the operation of said gating means, an automatic-gain-control-signal component is added to said automatic-gain-control-detector circuit.

2. Apparatus as claimed in claim 1 characterized in that said gating means comprises a clamping diode so poled as to conduct to prevent the application of a positive direct-current voltage to said automatic-gain-control-detector circuit, and a source of positive potential in combination with a voltage-dividing network so connected as to provide a positive delay voltage to said automatic-gain-control-detector circuit when said clamping diode is in non-conducting condition.

3. Apparatus as claimed in claim 1 characterized in that said gating means comprises, in combination, a diode detector for providing a direct-current output signal in response to the applied alternating-current component of said detected signal, a gate tube having at least triode elements, means for applying the output of said diode detector to said gate tube to bias said tube beyond cut-off when the alternating-current component of said detected signal is larger than a predetermined value, means for developing a direct-current voltage in the output circuit of said gate tube when said gate tube is conductive, and means for applying said direct-current voltage to said automatic-gain-control-detector circuit.

4. In an automatic-gain-control system for a television receiver having a source of detected video signal and an automatic-gain-control detector; a first path coupling said source of detected video signal to said automatic-gain-control detector, said first path comprising alternating-current coupling means for applying at least a portion of said detected video signal to said automatic-gain-control detector; and a second path coupling said source of detected video signal to the circuit of said automatic-gain-control detector, said second path including gating means sensitive to the amplitude of a component of the detected video signal and adapted to discriminate between detected video signals of different strength, said gating means comprising a clamping diode so poled as to conduct to prevent the application of a positive direct-current voltage to said automatic-gain-control-detector circuit, and a source of positive potential in combination with a voltage-dividing network so connected as to provide a positive delay voltage to said automatic-gain-control-detector circuit when said clamping diode is in non-conducting condition.

5. In an automatic-gain-control system for a television receiver having a source of detected video signal and an automatic-gain-control detector; a first path coupling said source of detected video signal to said automatic-gain-control detector, said first path comprising alternating-current coupling means for applying at least a portion of said detected video signal to said automatic-gain-control detector; and a second path coupling said source of detected video signal to the circuit of said automatic-gain-control detector, said second path including gating means sensitive to the amplitude of a component of the detected video signal and adapted to discriminate between detected video signals of different strength, said gating means comprising, in combination, a diode detector for providing a direct-current output signal in response to the application thereto of an alternating-current component of said detected signal, a gate tube having at least triode elements, means for applying the output of said diode detector to said gate tube to bias said tube beyond cutoff when the alternating-current component of said detected signal is larger than a predetermined value, means for developing a direct-current voltage in the output circuit of said gate tube when said gate tube is conductive, and means for applying said direct-current voltage to said automatic-gain-control-detector circuit.

6. In an automatic-gain-control system for a television receiver having a source of detected video signal and an automatic-gain-control detector; a first path coupling said source of detected video signal to said automatic-gain-control detector, said first path including means responsive solely to the horizontal-synchronizing-pulse component of said detected video signal, whereby in the absence of said horizontal-synchronizing-pulse component the automatic-gain-control signal developed by way of said first path is subject to being reduced to zero; and a second path coupling said source of detected video signal to the circuit of said automatic-gain-control detector, said second path including gating means direct-current coupled to said source of detected video signal and sensitive to the amplitude of the direct-current component of said detected video signal to effect application of an automatic-gain-control component to said automatic-gain-control-detector circuit when said direct-current component of said detected video signal is greater than a predetermined value irrespective of the presence or absence of the horizontal-synchronizing-pulse component.

7. In an automatic-gain-control system for a television receiver having a source of detected video signal and an automatic-gain-control detector; a first path coupling said source of detected video signal to said automatic-gain-control detector, said first path including means responsive solely to the horizontal-synchronizing-pulse component of said detected video signal, whereby in the absence of said horizontal-synchronizing-pulse component the automatic-gain-control signal developed by way of said first path is subject to being reduced to zero; and a second path coupling said source of detected video signal to the circuit of said automatic-gain-control detector, said second path including gating means alternating-current coupled to said source of detected video signal and sensitive to the amplitude of the alternating-current component of said detected video signal to effect application of an automatic-gain-control component to said automatic-gain-control-detector circuit when said alternating-component of said detected video signal is less than a predetermined value irrespective of the presence or absence of the horizontal-synchronizing-pulse component.

8. In an automatic-gain-control system for a television receiver; a source of detected video signal having picture-intelligence and synchronizing-pulse components; means for applying said detected video signal to a pick-off tube so biased that said tube is cut-off during the picture-intelligence portion of said applied video signal but conducts during the synchronizing-pulse intervals; a network connected in the plate-cathode circuit of said pick-off tube tuned to an integral multiple of said frequency of the horizontal synchronizing pulses, whereby said tuned network is shock excited by the pulses of plate current which flow through said pick-off tube during the horizontal-synchronizing-pulse intervals, and whereby there is developed across said tuned network a sine wave signal whose amplitude is a function of the amplitude of the synchronizing pulses applied to said pick-off tube; an automatic-gain-control-detector circuit; alternating-current coupling means for applying said sine wave signal to said automatic-gain-control-detector circuit to develop a direct-current control signal whose magnitude is a function of the amplitude of said sine wave signal; and bypass means coupling said source of detected video signal to said automatic-gain-control-detector circuit by a path which bypasses said pick-off tube and tuned network, said bypass means including gating means sensitive to the amplitude of a component of the detected video signal and adapted to discriminate between detected video signals of different strength, said gating means operating when said component of said detected video signal is different in a selected direction from a predetermined value, said bypass means also including means whereby, as a result of the operation of said gating means, an automatic-gain-signal component is added to said automatic-gain-control-detector circuit.

References Cited in the file of this patent

UNITED STATES PATENTS

| | | |
|---|---|---|
| 2,251,929 | Freeman et al. | Aug. 12, 1941 |
| 2,356,140 | Applegarth | Aug. 22, 1944 |
| 2,586,760 | Bedford | Feb. 19, 1952 |